US012692009B2

(12) United States Patent
Durocher

(10) Patent No.: US 12,692,009 B2
(45) Date of Patent: Jul. 28, 2026

(54) HEAT EXCHANGER ASSEMBLY FOR AN AIRCRAFT

(71) Applicant: Pratt & Whitney Canada Corp., Longueuil (CA)

(72) Inventor: Eric S. Durocher, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 112 days.

(21) Appl. No.: 18/123,116

(22) Filed: Mar. 17, 2023

(65) Prior Publication Data

US 2024/0308677 A1    Sep. 19, 2024

(51) Int. Cl.
| | |
|---|---|
| *B64D 33/10* | (2006.01) |
| *F02C 7/14* | (2006.01) |
| *F28D 7/00* | (2006.01) |
| F28D 21/00 | (2006.01) |

(52) U.S. Cl.
CPC .............. *B64D 33/10* (2013.01); *F02C 7/14* (2013.01); *F28D 7/0008* (2013.01); *F28D 2021/0021* (2013.01)

(58) Field of Classification Search
CPC . F28F 9/0282; F28F 9/028; F01P 3/18; F01D 25/08; F01D 25/10; F01D 25/12; F02C 7/12; F02C 7/14; F02C 7/18; F02C 7/185; B64D 33/08; B64D 33/10; F05D 2260/601
See application file for complete search history.

(56) References Cited

U.S. PATENT DOCUMENTS

| | | | | |
|---|---|---|---|---|
| 2,998,232 A | * | 8/1961 | Andre | ..................... F02M 71/04 |
| | | | | 261/36.2 |
| 4,195,472 A | * | 4/1980 | Robinson | ................ F02C 6/203 |
| | | | | 60/39.163 |
| 5,284,012 A | | 2/1994 | Laborie | |
| 5,438,823 A | * | 8/1995 | Loxley | ...................... F02C 7/14 |
| | | | | 165/41 |
| 8,690,098 B2 | | 4/2014 | Todorovic | |
| 9,797,297 B2 | | 10/2017 | Thomassin | |

(Continued)

FOREIGN PATENT DOCUMENTS

| | | | | |
|---|---|---|---|---|
| CH | | 226534 A | * | 4/1942 |
| WO | 2015197974 A1 | | | 12/2015 |

OTHER PUBLICATIONS

EP search report for EP24164292.5 dated Jul. 19, 2024.

*Primary Examiner* — Devon C Kramer
*Assistant Examiner* — Sean V Meiller
(74) *Attorney, Agent, or Firm* — Getz Balich LLC

(57)    ABSTRACT

A heat exchanger assembly for an aircraft includes a housing, a heat exchanger, and a nozzle. The housing includes an inner flow path wall and an outer flow path wall. The inner flow path wall and the outer flow path wall form an air inlet, an air outlet, and a venturi channel. The heat exchanger includes a heat exchanger body, a heat transfer plenum, a plenum inlet, and a plenum outlet. The heat exchanger body is disposed downstream of the venturi channel within the air flow path. The heat exchanger is configured to direct a fluid from through the heat transfer plenum from the plenum inlet to the plenum outlet. The nozzle includes a nozzle housing disposed within the air flow path. The nozzle housing forms a nozzle inlet and a nozzle outlet. The nozzle outlet is disposed within the venturi channel.

16 Claims, 6 Drawing Sheets

(56)  References Cited

U.S. PATENT DOCUMENTS

| 10,883,422 | B2 * | 1/2021 | Boujida | F02C 6/08 |
| 11,286,881 | B2 | 3/2022 | Boyd | |
| 2012/0168115 | A1 * | 7/2012 | Raimarckers | F01D 25/08 |
| | | | | 165/41 |
| 2019/0072035 | A1 * | 3/2019 | Peace | F02C 7/18 |
| 2022/0154644 | A1 | 5/2022 | Johnson | |
| 2024/0151474 | A1 | 5/2024 | Toubiana | |

* cited by examiner

HEAT EXCHANGER ASSEMBLY FOR AN AIRCRAFT

TECHNICAL FIELD

This disclosure relates generally to heat exchanger assemblies for an aircraft and, more particularly, to heat exchanger assemblies for low air flow conditions.

BACKGROUND OF THE ART

Some propulsion systems for aircraft may include heat exchanger assemblies configured to cool or heat one or more fluids (e.g., lubricant, fuel, cooling air, etc.) for the propulsion system. Various heat exchanger systems are known in the art for controlling fluid temperatures. While these known systems have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a heat exchanger assembly for an aircraft includes a housing, a heat exchanger, and a nozzle. The housing includes an inner flow path wall and an outer flow path wall. The inner flow path wall and the outer flow path wall form an air inlet, an air outlet, and a venturi channel. The inner flow path wall and the outer flow path wall are configured to direct air along an air flow path from the air inlet, through the venturi channel, and to the air outlet. The heat exchanger includes a heat exchanger body, a heat transfer plenum, a plenum inlet, and a plenum outlet. The heat exchanger body is disposed downstream of the venturi channel within the air flow path. The heat exchanger is configured to direct a fluid from through the heat transfer plenum from the plenum inlet to the plenum outlet to effect heat transfer between the fluid and the air along the air flow path. The nozzle includes a nozzle housing disposed within the air flow path. The nozzle housing forms a nozzle inlet and a nozzle outlet. The nozzle outlet is disposed within the venturi channel.

In any of the aspects or embodiments described above and herein, the heat exchanger assembly may further include a control valve connected in fluid communication with the nozzle inlet. The control valve may be configured to control a flow rate of pressurized air directed to the nozzle inlet.

In any of the aspects or embodiments described above and herein, the inner flow path wall may form an inner venturi surface of the venturi channel and the outer flow path wall may form an outer venturi surface of the venturi channel.

In any of the aspects or embodiments described above and herein, the heat exchanger assembly may further include a strut mounted to the nozzle housing. The strut may extend though the inner flow path wall.

In any of the aspects or embodiments described above and herein, the strut may be configured as a hollow strut forming an air flow passage. The strut may be mounted to the nozzle at the nozzle inlet with the air flow passage connected in fluid communication with the nozzle inlet.

In any of the aspects or embodiments described above and herein, the strut may be further mounted to the outer flow path wall.

In any of the aspects or embodiments described above and herein, the heat exchanger may further include a plurality of heat transfer surface structures extending from the heat exchanger body into the air flow path.

In any of the aspects or embodiments described above and herein, the plurality of heat transfer surface structures may include a plurality of parallel heat transfer plates.

In any of the aspects or embodiments described above and herein, the outer flow path wall may extend between and to an upstream end and a downstream end. The air inlet may be disposed at the upstream end. The air outlet may be disposed at the downstream end.

In any of the aspects or embodiments described above and herein, the outer flow path wall may extend between and to a first lateral side and a second lateral side. The outer flow path wall may include an outer wall portion, a first lateral wall portion, and a second lateral wall portion. The outer wall portion may be spaced from the inner flow path wall. The first lateral wall portion may extend between and connect the outer wall portion and the inner flow path wall at the first lateral side. The second lateral wall portion may extend between and connect the outer wall portion and the inner flow path wall at the second lateral side.

According to another aspect of the present disclosure, an aircraft propulsion system includes a nacelle and a heat exchanger assembly. The nacelle forms an aerodynamic cover for the propulsion system. The nacelle includes an external skin. The heat exchanger assembly is disposed on the external skin. The heat exchanger assembly includes a housing, a heat exchanger, and a nozzle. The housing includes an inner flow path wall and an outer flow path wall. The inner flow path wall and the outer flow path wall form an air inlet, an air outlet, and a venturi channel. The inner flow path wall and the outer flow path wall are configured to direct air along an air flow path outside of the nacelle from the air inlet, through the venturi channel, and to the air outlet. The heat exchanger forms a portion of the air flow path downstream of the venturi channel. The nozzle includes a nozzle housing disposed within the air flow path. The nozzle housing forms a nozzle inlet and a nozzle outlet. The nozzle outlet is disposed within the venturi channel.

In any of the aspects or embodiments described above and herein, the external skin may form the inner flow path wall.

In any of the aspects or embodiments described above and herein, the aircraft propulsion system may further include a gas turbine engine housed within the nacelle. The gas turbine engine may include a compressor section. The compressor section may be configured to direct compressor bleed air to the nozzle.

In any of the aspects or embodiments described above and herein, the heat exchanger may include a heat exchanger body and a heat transfer plenum. The heat exchanger body may form a heat transfer panel between the air flow path and the heat transfer plenum. The heat transfer panel may form a portion of the inner flow path wall. The heat transfer plenum may be configured to receive a fluid from the gas turbine engine.

According to another aspect of the present disclosure, an aircraft propulsion system includes a heat exchanger assembly and a control system. The heat exchanger assembly includes a housing, a heat exchanger, a nozzle, and a control valve. The housing includes an inner flow path wall and an outer flow path wall. The inner flow path wall and the outer flow path wall form an air inlet, an air outlet, and a venturi channel. The inner flow path wall and the outer flow path wall are configured to direct air along an air flow path from the air inlet, through the venturi channel, and to the air outlet. The heat exchanger forms a portion of the air flow path downstream of the venturi channel. The nozzle includes a nozzle housing disposed within the air flow path. The nozzle housing forming a nozzle inlet and a nozzle outlet. The nozzle outlet is disposed within the venturi channel. The control valve is connected in fluid communication with the nozzle inlet. The control valve is configured to control a first flow rate of pressurized air directed to the nozzle inlet. The control system includes a processor in communication with a non-transitory memory storing instructions, which instructions when executed by the processor, cause the processor to control a position of the control valve to control a second flow rate of air along the air flow path.

In any of the aspects or embodiments described above and herein, the aircraft propulsion system may further include a gas turbine engine. The instructions, when executed by the processor, may further cause the processor to identify a hotel mode of operation for gas turbine engine and control the position of the control valve by opening the control valve in response to identification of the hotel mode of operation.

In any of the aspects or embodiments described above and herein, the gas turbine engine may include a propeller. The propeller may be stationary during the hotel mode of operation for the gas turbine engine.

In any of the aspects or embodiments described above and herein, the instructions, when executed by the processor, may further cause the processor to: identify a second mode of operation for gas turbine engine, the second mode of operation different than the hotel mode of operation, and control the position of the control valve by shutting the control valve in response to identification of the second mode of operation.

In any of the aspects or embodiments described above and herein, the propeller may be rotating during the second mode of operation for the gas turbine engine.

In any of the aspects or embodiments described above and herein, the heat exchanger assembly may further include a temperature sensor disposed at the heat exchanger. The temperature sensor may be connected in signal communication with the control system. The instructions, when executed by the processor, may further cause the processor to control the position of the control valve based on a temperature output signal of the temperature sensor.

The present disclosure, and all its aspects, embodiments and advantages associated therewith will become more readily apparent in view of the detailed description provided below, including the accompanying drawings.

DETAILED DESCRIPTION

Figure 1:
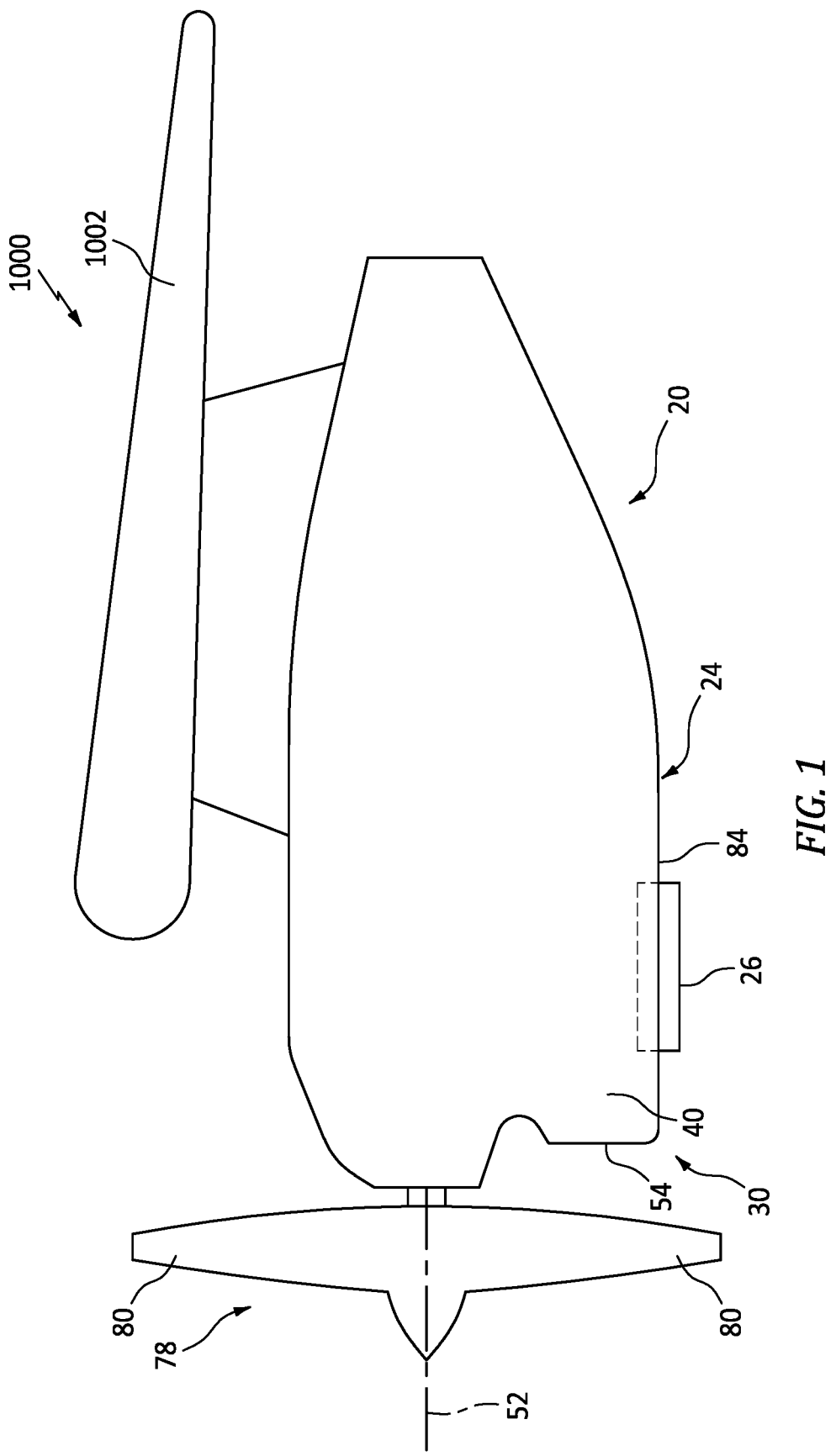
FIG. 1 diagrammatically illustrates a side view of a portion of an aircraft including a propulsion system, in accordance with one or more embodiments of the present disclosure.
Figure 2:
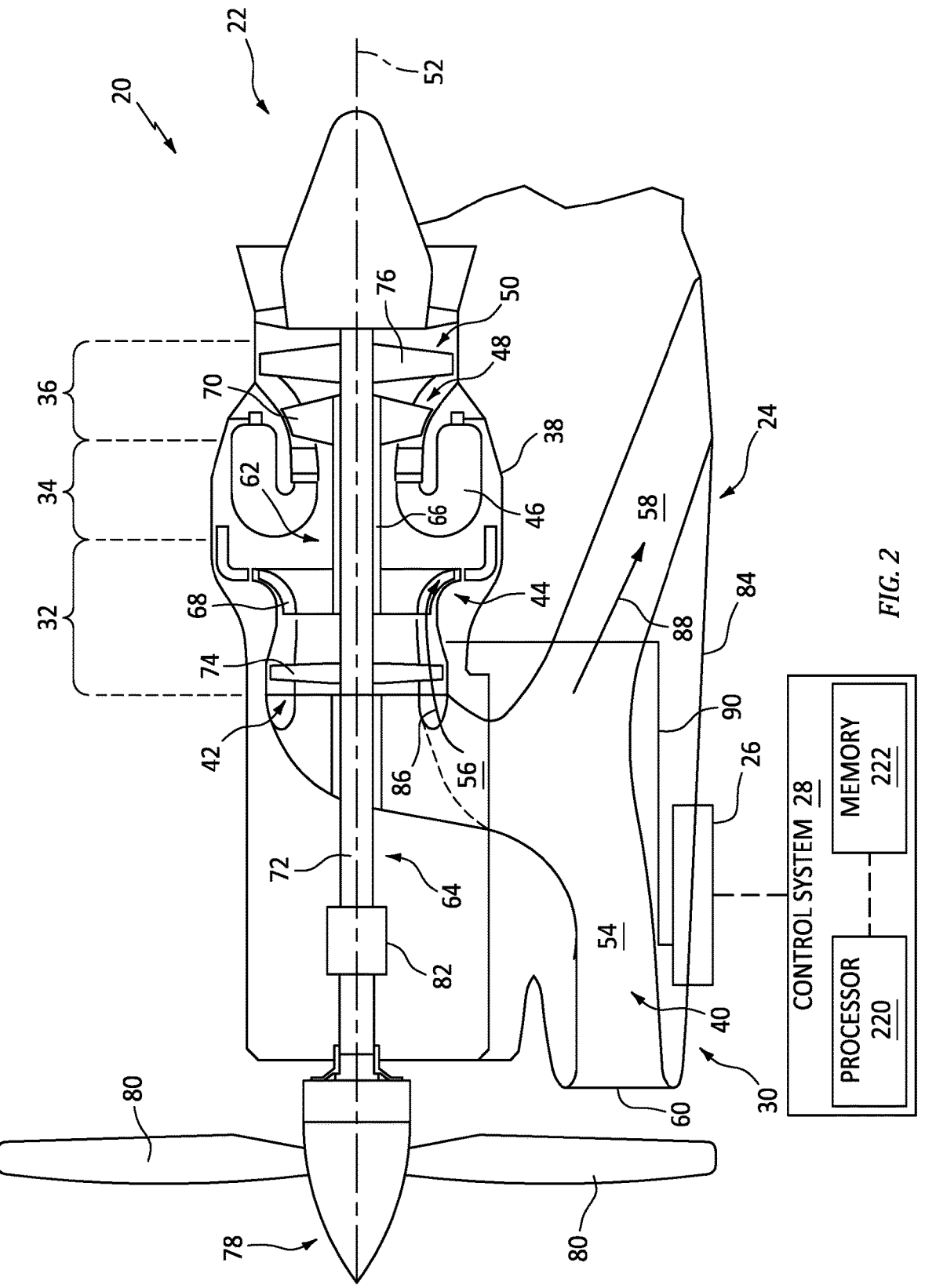
FIG. 2 diagrammatically illustrates a cutaway, side view of a propulsion system for an aircraft, in accordance with one or more embodiments of the present disclosure.

FIGS. 1 and 2 are schematic illustrations of a propulsion system 20 configured for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). For example, the propulsion system 20 of FIG. 1 is mounted to an aircraft 1000 and, in particular, to a wing 1002 of the aircraft 1000. The present disclosure, however, is not limited to the particular propulsion system 20 mounting configuration of FIG. 1. The propulsion system 20 of FIGS. 1 and 2 includes a gas turbine engine 22, a nacelle 24, a heat exchanger assembly 26, and a control system 28.

The gas turbine engine 22 of FIGS. 1 and 2 is configured as a turboprop engine. However, the present disclosure is not limited to any particular configuration of gas turbine engine for the propulsion assembly 20, and examples of gas turbine engine configurations for the propulsion system 20 may include, but are not limited to, a turbofan engine, a turbojet engine, a propfan engine, or the like. The gas turbine engine 22 of FIGS. 1 and 2, for example, includes an air inlet section 30, a compressor section 32, a combustor section 34, a turbine section 36, and an engine static structure 38. The air inlet section 30 includes an air intake 40. The compressor section 32 may include a low-pressure compressor (LPC) 42 and a high-pressure compressor (HPC) 44. The combustor section 34 includes an annular combustor 46. The turbine section 36 may include a high-pressure turbine (HPT) 48 a low-pressure turbine (LPT) 50.

The gas turbine engine 22 sections 30, 32, 34, and 36 of FIG. 2 are arranged sequentially along an axial centerline 52 (e.g., a rotational axis) of the propulsion system 20. The engine static structure 38 may include, for example, one or more engine cases for the gas turbine engine 22. The engine static structure 38 may additionally include cowlings, bearing assemblies, or other structural components of the gas turbine engine 22. The one or more engine cases house and/or structurally support one or more of the engine sections 30, 32, 34, and 36. The engine sections 32, 34, and 36 may be collectively referred to as an "engine core" of the gas turbine engine 22.

The air intake 40 is configured to direct a flow of ambient air into the engine core of the gas turbine engine 22. The air intake 40 of FIG. 2 includes an air inlet duct 54, a core flow duct 56, and a bypass flow duct 58. The air inlet duct 54 includes an intake inlet 60 of the air intake 40. The intake inlet 60 forms an opening at (e.g., on, adjacent, or proximate) an upstream end of the air intake 40. The air inlet duct 54 may be disposed outside of the gas turbine engine 22 and may be formed by, disposed within, or otherwise in contact with the nacelle 24. The intake inlet 60 of FIGS. 1 and 2 is radially offset from the axial centerline 52. For example, the intake inlet 60 (e.g., the entire intake inlet 60) may be radially offset from the axial centerline 52 in a radial direction (e.g., downwardly), as shown in FIGS. 1 and 2. The intake inlet 60 may also be configured with an axial facing orientation. For example, the intake inlet 60 of FIGS. 1 and 2 faces in an axially-forward direction. The present disclosure, however, is not limited to the particular configuration and orientation of the intake inlet 60 of FIGS. 1 and 2.

The gas turbine engine 22 of FIG. 2 further includes a first rotational assembly 62 (e.g., a high-pressure spool) and a second rotational assembly 64 (e.g., a low-pressure spool). The first rotational assembly 62 and the second rotational assembly 64 are mounted for rotation about the axial centerline 52 relative to the engine static structure 38.

The first rotational assembly 62 includes a first shaft 66, a bladed first compressor rotor 68 for the high-pressure compressor 44, and a bladed first turbine rotor 70 for the high-pressure turbine 48. The first shaft 66 interconnects the bladed first compressor rotor 68 and the bladed first turbine rotor 70. The second rotational assembly 64 includes a second shaft 72, a bladed second compressor rotor 74 for the low-pressure compressor 42, a bladed second turbine rotor 76 for the low-pressure turbine 50, and a propeller 78. The second shaft 72 interconnects the bladed second compressor rotor 74 and the bladed second turbine rotor 76. The propeller 78 includes a plurality of propeller blades 80 circumferentially distributed about the propeller 78. The second shaft 72 may be connected to the propeller 78 by one or more gear assemblies 82. The gear assemblies 82 may be configured to drive the propeller 78 at a reduced rotational speed relative to the second shaft 72. The gear assemblies 82 may additionally or alternatively be configured as a clutch to couple or decouple the propeller 78 and the second shaft 72. The propeller 78 may alternatively be directed coupled to the second shaft 72.

The nacelle 24 houses the gas turbine engine 22 and forms and aerodynamic cover for the propulsion system 20. The nacelle 24 may extend circumferentially about (e.g., completely around) the axial centerline 52 to surround the gas turbine engine 22. The nacelle 24 may additionally surround and/or support portions of the air intake 40. The nacelle 24 includes an external skin 84 forming an external aerodynamic surface of the nacelle 24 and, therefore, the propulsion system 20.

During operation of the propulsion system 20 of FIGS. 1 and 2, ambient air enters the propulsion system 20 through the intake inlet 60 and is directed by the air inlet duct 54 into a core flow path 86 through the core flow duct 56 and a bypass flow path 88 through the bypass flow duct 58. The core flow path 86 extends axially through the gas turbine engine 22 sections 32, 34, and 36 of FIG. 2. The air within the core flow path 86 may be referred to as "core air." The core air is compressed by the bladed second compressor rotor 74 and the bladed first compressor rotor 68 and directed into a combustion chamber of the combustor 46. Fuel is injected into the combustion chamber and mixed with the compressed core air to provide a fuel-air mixture. This fuel-air mixture is ignited and combustion products thereof, which may be referred to as "core combustion gas," flow through and sequentially cause the bladed first turbine rotor 70 and the bladed second turbine rotor 76 to rotate. The rotation of the bladed first turbine rotor 70 and the bladed second turbine rotor 76 respectively drive rotation of the first rotational assembly 62 and the second rotational assembly 64. Rotation of the second rotational assembly 64 further drives rotation of the propeller 78 to provide propulsion (e.g., thrust) for the aircraft 1000.

During a grounded condition of aircraft 1000, the gas turbine engine 22 may be operated to drive various systems of the aircraft 1000. For example, one or more of the rotational assemblies 62, 64 of the gas turbine engine 22 may be operated, as described above, to extract power from gas turbine engine 22 accessories (e.g., an electrical generator, a hydraulic pump, a compressor bleed air assembly, etc.) to support aircraft 1000 systems such as, but not limited to, an aircraft electrical distribution system, an aircraft environmental control system (ECS), aircraft hydraulic control systems, aircraft braking systems, and the like. This type of power extraction condition for the grounded aircraft 1000 may be referred to as a "hotel" mode of operation (or alternatively an auxiliary power unit ("APU") mode of operation) for the gas turbine engine 22. In the hotel mode of operation, the gas turbine engine 22 may be operated to facilitate operation of various aircraft 1000 systems while the propeller 78 is prevented from rotating. For example, the propeller 78 may be decoupled from the second shaft 72 and/or locked to prevent rotation of the propeller 78.

The heat exchanger assembly 26 of FIGS. 1 and 2 disposed at (e.g., on, adjacent, or proximate) an exterior of the propulsion system 20. For example, the heat exchanger assembly 26 of FIGS. 1 and 2 is disposed (e.g., mounted) on the nacelle 24 downstream (e.g., axially aft) of the propeller 78 and the intake inlet 60. The heat exchanger assembly 26 of FIGS. 1 and 2 is positioned on a bottom (e.g., a 6 o'clock position) of the propulsion system 20 and its nacelle 24. However, the heat exchanger assembly 26 may alternatively be positioned on other portions (e.g., top, sides, etc.) of the nacelle 24. Moreover, the heat exchanger 26 may be disposed on aerostructures of the aircraft 1000 other than the propulsion system 20 such as, but not limited to, a wing (e.g., the wing 1002), a pylon, or a fuselage of the aircraft 1000. As will be discussed in further detail, the heat exchanger assembly 26 is configured to receive a pressurized air or other pressurized fluid. For example, the heat exchanger assembly 26 may receive pressurized compressor bleed air 90 from the compressor section 32 (e.g., a discharge or intermediate stage of the low-pressure compressor 42 or the high-pressure compressor 44). The heat exchanger assembly 26 is connected in fluid communication with the compressor section 32 by any suitable conduit (e.g., pipe, hose, tube, etc.), series of conduits, or fluid systems configured to direct the compressor bleed air 90 to the heat exchanger assembly 26.

Figure 3:
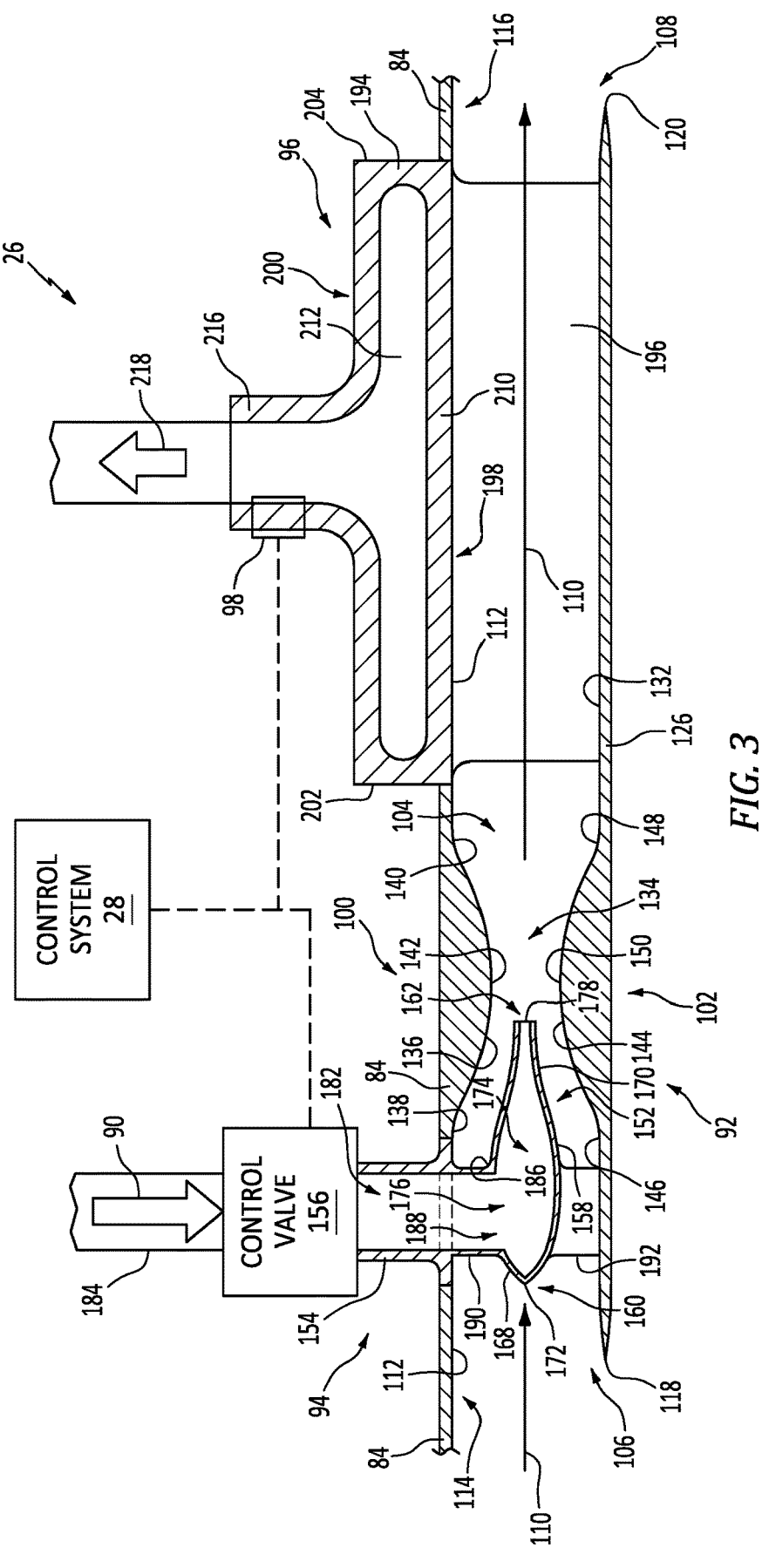
FIG. 3 diagrammatically illustrates a cutaway, side view of a heat exchanger assembly for an aircraft propulsion system, in accordance with one or more embodiments of the present disclosure.
Figure 4:
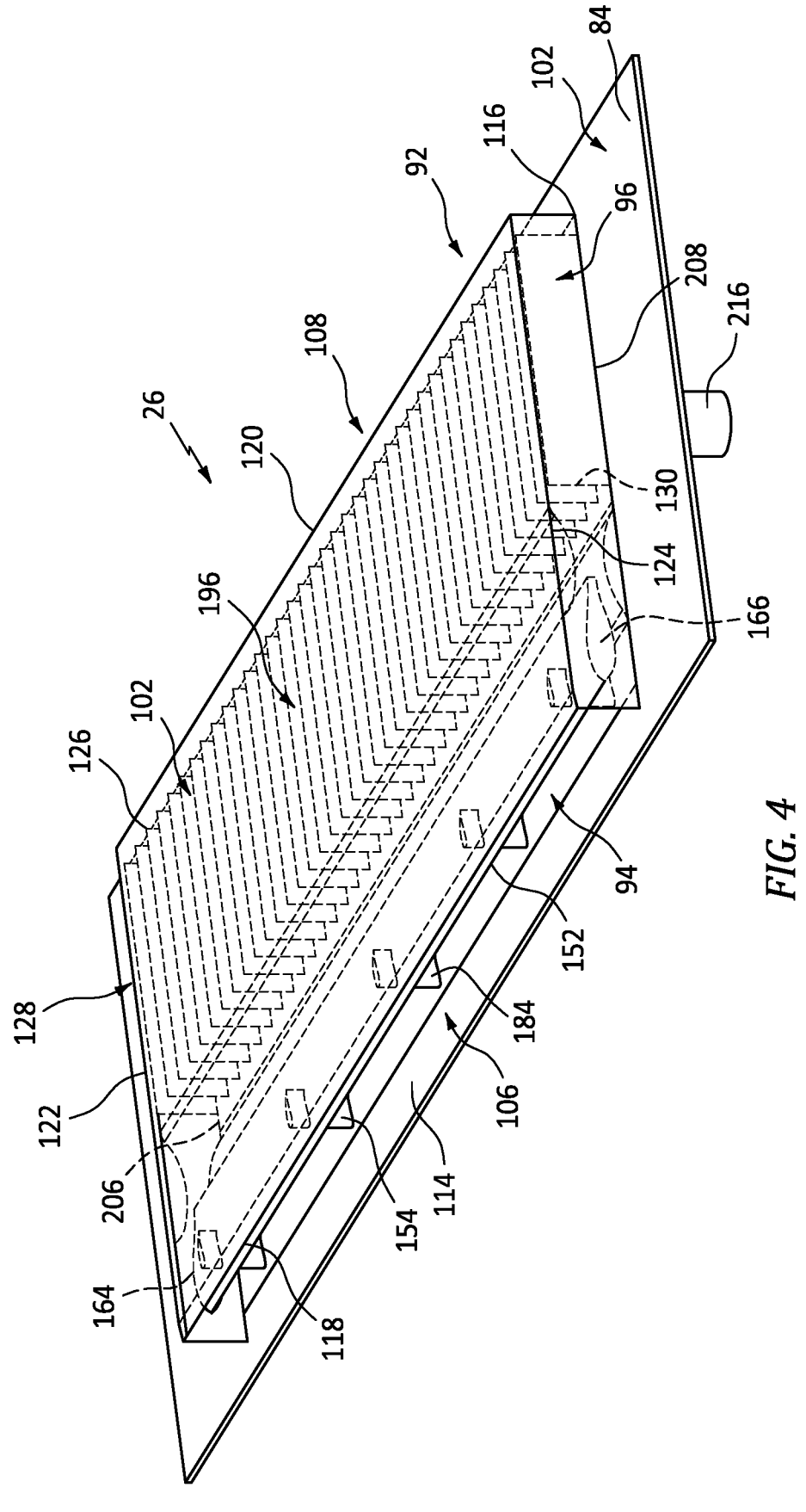
FIG. 4 illustrates a perspective view of the heat exchanger assembly of FIG. 3, in accordance with one or more embodiments of the present disclosure.
Figure 5:
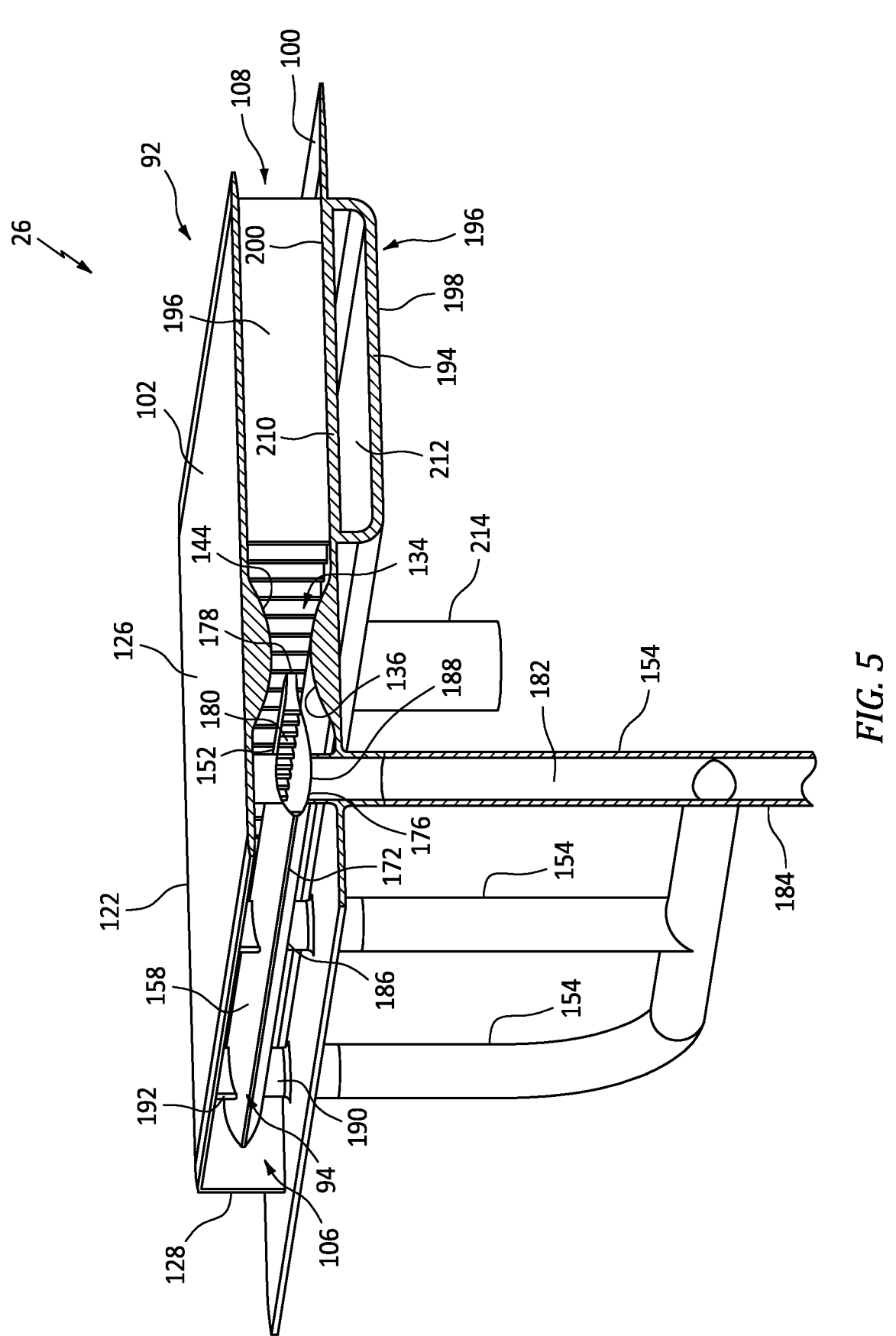
FIG. 5 illustrates a cutaway, perspective view of the heat exchanger assembly of FIG. 3, in accordance with one or more embodiments of the present disclosure.

Referring to FIGS. 3-5, the heat exchanger 26 is configured as a thermal management system for fluids of the aircraft 1000, the propulsion system 20, and/or the gas turbine engine 22 for both hotel and non-hotel modes of operation of the gas turbine engine 22 (see FIGS. 1 and 2). The heat exchanger assembly 26 of FIGS. 3-5 includes a housing 92, a nozzle assembly 94, and a heat exchanger 96. The heat exchanger assembly 26 may additionally include one or more sensors 98.

The housing 92 includes an inner flow path wall 100 and an outer flow path wall 102. The inner flow path wall 100 and the outer flow path wall 102 form an air flow cavity 104 of the heat exchanger assembly 26 between the inner flow path wall 100 and the outer flow path wall 102. The inner flow path wall 100 and the outer flow path wall 102 form an air inlet 106 of the air flow cavity 104 and an air outlet 108 of the air flow cavity 104. The air inlet 106 is disposed at (e.g., on, adjacent, or proximate) an upstream end (e.g., an axially forward end) of the heat exchanger assembly 26. The air outlet 108 is disposed at (e.g., on, adjacent, or proximate) a downstream end (e.g., an axially aft end) of the heat exchanger assembly 26. The inner flow path wall 100 and the outer flow path wall 102 are configured to direct ambient air through the air flow cavity 104, from the air inlet 106 to the air outlet 108, along an air flow path 110. The air flow path 110 may generally extend in an axial direction (e.g., relative to the axial centerline 52), however, the air flow path 110 is not limited to any particular orientation.

The inner flow path wall 100 of FIGS. 3-5 is formed, at least in part, by a portion of the nacelle external skin 84. The inner flow path wall 100 forms an inner flow path surface 112. The inner flow path surface 112 may be disposed coincident with other portions of the external skin 84 forming the external aerodynamic surface of the nacelle 24 (see FIGS. 1 and 2). The inner flow path surface 112 faces the outer flow path wall 102. The inner flow path surface 112 extends through the heat exchanger assembly 26 between and to an upstream position 114 (e.g., an axially forward end) of the of the inner flow path surface 112 and a downstream position 116 (e.g., an axially aft end) of the inner flow path surface 112.

The outer flow path wall 102 is disposed (e.g., mounted) on the inner flow path wall 100. The outer flow path wall 102 extends between and to an upstream end 118 (e.g., an axially forward end) of the outer flow path wall 102 and a downstream end 120 (e.g., an axially aft end) of the outer flow path wall 102. The outer flow path wall 102 extends between and to a first lateral side 122 of the outer flow path wall 102 and a second lateral side 124 of the outer flow path wall 102. The first lateral side 122 and the second lateral side 124 extend between and to the upstream end 118 and the downstream end 120. The outer flow path wall 102 of FIGS. 3-5 includes an outer wall portion 126, a first lateral wall portion 128, and a second lateral wall portion 130. Each of the outer wall portion 126, the first lateral wall portion 128, and the second lateral wall portion 130 extend between and to the upstream end 118 and the downstream end 120. The outer wall portion 126 is spaced from the inner flow path wall 100 to form the air flow cavity 104 between the outer wall portion 126 and the inner flow path wall 100. The outer wall portion 126 extends between and to the first lateral side 122 and the second lateral side 124. The outer wall portion 126 forms an outer flow path surface 132. The outer flow path surface 132 faces the inner flow path surface 112. The first lateral wall portion 128 extends between and connects the outer wall portion 126 and the inner flow path wall 100 at (e.g., on, adjacent, or proximate) the first lateral side 122. The second lateral wall portion 130 extends between and connects the outer wall portion 126 and the inner flow path wall 100 at (e.g., on, adjacent, or proximate) the second lateral side 124. While the inner flow path wall 100 and the outer flow path wall 102 are illustrated in FIGS. 3-5 as being substantially flat (e.g., planar) for clarity, it should be understood that the housing 92 of the present disclosure may also be configured with curved inner flow path walls and outer flow path walls to conform to various aircraft aero-structures (e.g., a nacelle, a pylon, a wing, a fuselage, etc.).

The inner flow path surface 112 and the outer flow path surface 132 cooperatively form a venturi channel 134 of the air flow cavity 104. Air is directed through the venturi channel 134 as the air flows along the air flow path 110 from the air inlet 106 to the air outlet 108.

The inner flow path surface 112 forms an inner venturi surface 136 of the venturi channel 134. The inner venturi surface 136 may be formed by the nacelle external skin 84 or, for example, by a curved panel disposed on (e.g., attached to) the nacelle external skin 84. The inner venturi surface 136 is configured as a rounded, convex surface extending toward the outer flow path surface 132. The inner venturi surface 136 is disposed between and spaced from the upstream position 114 and the downstream position 116. The inner venturi surface 136 extends laterally all or a substantial portion of a lateral distance extending from the first lateral wall portion 128 to the second lateral wall portion 130. The inner venturi surface 136 extends (e.g., in an upstream to downstream direction) between and to an upstream end 138 of the inner venturi surface 136 and a downstream end 140 of the inner venturi surface 136. The inner venturi surface 136 may transition increasingly closer to (e.g., converge toward) the outer flow path surface 132 from the upstream end 138 toward a center 142 of the inner venturi surface 136. The inner venturi surface 136 may transition increasingly further from (e.g., diverge from) the outer flow path surface 132 from the center 142 toward the downstream end 140. The center 142 is positioned between the upstream end 138 and the downstream end 140 (e.g., in an upstream to downstream direction).

The outer flow path surface 132 forms an outer venturi surface 144 of the venturi channel 134. The outer venturi surface 144 is aligned with (e.g., in an upstream to downstream direction) and faces the inner venturi surface 136. The outer venturi surface 144 is configured as a rounded, convex surface extending toward the inner flow path surface 112. The outer venturi surface 144 is disposed between and spaced from the upstream end 118 and the downstream end 120. The outer venturi surface 144 extends laterally all or a substantial portion of a lateral distance extending from the first lateral wall portion 128 to the second lateral wall portion 130. The outer venturi surface 144 extends (e.g., in an upstream to downstream direction) between and to an upstream end 146 of the outer venturi surface 144 and a downstream end 148 of the outer venturi surface 144. The outer venturi surface 144 may transition increasingly closer to (e.g., converge toward) the inner flow path surface 112 from the upstream end 146 toward a center 150 of the outer venturi surface 144. The outer venturi surface 144 may transition increasingly further from (e.g., diverge from) the inner flow path surface 112 from the center 150 toward the downstream end 148. The center 150 is positioned between the upstream 146 and the downstream end 148 (e.g., in an upstream to downstream direction).

The nozzle assembly 94 of FIGS. 3-5 includes a nozzle 152 and at least one strut 154. The nozzle assembly 94 may further include a control valve 156.

The nozzle 152 includes a nozzle housing 158 disposed within the air flow cavity 104. The nozzle housing 158 extends between and to an upstream end 160 (e.g., an axially forward end) of the nozzle housing 158 and a downstream end 162 (e.g., an axially aft end) of the nozzle housing 158. The nozzle housing 158 extends between and to a first lateral side 164 of the nozzle housing 158 and a second lateral side 166 of the nozzle housing 158. The first lateral side 164 may be positioned at (e.g., on, adjacent, or proximate) the first lateral wall portion 128. The second lateral side 164 may be positioned at (e.g., on, adjacent, or proximate) the second lateral wall portion 130. While the nozzle assembly 94 of FIGS. 3-5 includes a single nozzle 152, the nozzle assembly 94 may alternatively include a plurality of discrete nozzles 152 laterally distributed between the first lateral wall portion 128 and the second lateral wall portion 130.

The nozzle housing 158 of FIGS. 3-5 forms an inner housing surface 168 and an outer housing surface 170. The inner housing surface 168 and the outer housing surface 170 extend between and to the upstream end 160 and the downstream end 162. The inner housing surface 168 and the outer housing surface 170 extend between and to the first lateral side 164 and the second lateral side 166. The inner housing surface 168 faces the inner flow path surface 112. The outer housing surface 170 faces the outer flow path surface 132. The inner housing surface 168 and the outer housing surface 170 intersect at the upstream end 160 to form an aerodynamic leading edge 172 of the nozzle housing 158. The leading edge 172 is positioned at (e.g., on, adjacent, or proximate) or downstream of the air inlet 106. The nozzle housing 158 may be configured with an airfoil shape extending from the leading edge 172 toward the downstream end 162 to minimize aerodynamic drag of the nozzle housing 158 relative to the air flowing along the air flow path 110.

The nozzle housing 158 surrounds and forms a nozzle cavity 174 within the nozzle housing 158. The nozzle housing 158 forms at least one nozzle inlet 176 of the nozzle cavity 174 and at least one nozzle outlet 178 of the nozzle cavity 174. The nozzle housing 158 is configured to direct the compressor bleed air 90 through the nozzle cavity 174 from the nozzle inlet 176 to the nozzle outlet 178. The nozzle inlet 176 is formed through the nozzle housing 158 from the inner housing surface 168 to the nozzle cavity 174. The nozzle inlet 176 is connected in fluid communication with a respective one of the at least one strut 154, as will be discussed in further detail. The nozzle housing 158 of FIGS. 3-5 includes a plurality of the nozzle inlet 176 with the nozzle inlets 176 laterally distributed along the nozzle housing 158, for example, to facilitate relatively uniform compressor bleed air 90 flow within the nozzle cavity 174. The nozzle outlet 178 is disposed at (e.g., on, adjacent, or proximate) the downstream end 162. The nozzle outlet 178 is disposed at (e.g., on, adjacent, or proximate) the venturi channel 134. For example, the nozzle outlet 178 may be disposed between the upstream ends 138, 146 and the centers 142, 150. The nozzle outlet 178 of FIGS. 3-5 extends (e.g., laterally extends) between and to the first lateral side 164 and the second lateral side 166. While the nozzle 152 of FIGS. 3-5 includes a single nozzle outlet 178, the nozzle 152 may alternatively include a plurality of discrete nozzle outlets 178 laterally distributed between the first lateral side 164 and the second lateral side 166. The nozzle housing 158 may further include one or more flow guides 180 (e.g., air flow straighteners) disposed within the nozzle cavity 174 at (e.g., on, adjacent, or proximate) the nozzle outlet 178 to direct air flow through the nozzle outlet 178.

The at least one strut 154 is configured as a hollow strut (e.g., a tubular body) for directing the compressor bleed air 90 to the nozzle 152. For example, each strut 154 may form an air flow passage 182 connected in fluid communication with an upstream conduit 184 (e.g., pipe, hose, tube, etc.) directing (e.g., supplying) the compressor bleed air 90. The upstream conduit 184 may be common to each of the struts 154 as shown, for example, in FIG. 5. Each strut 154 extends from an interior of the nacelle 24, through the external skin 84, to the nozzle 152 (see FIGS. 1 and 2). Each strut 154 may be fixedly mounted to the nacelle 24 (e.g., to the external skin 84). Each strut 154 includes a nozzle end 186 disposed (e.g., mounted) on the nozzle housing 158 at (e.g., on, adjacent, or proximate) a respective nozzle inlet 176. Each strut 154 may form a passage outlet 188 of the air flow passage 182 at (e.g., on, adjacent, or proximate) the nozzle end 186. The passage outlet 188 may be fluidly coupled with a respective nozzle inlet 176. Each strut 154 may include an aerodynamic strut portion 190. The aerodynamic strut portion 190 may be a portion of the strut 154 disposed within the air flow cavity 104 (e.g., between the nozzle housing 158 and the inner flow path wall 100). The aerodynamic strut portion 190 may have a shape which is different than other portions of the strut 154. For example, the aerodynamic strut portion 190 may be configured with an airfoil shape to minimize aerodynamic drag of the strut 154 relative to the air flowing along the air flow path 110.

Each strut 154 of FIGS. 3-5 includes an outer strut portion 192 disposed between and connecting the nozzle housing 158 and the outer flow path wall 102. Accordingly, the struts 154 and their respective outer strut portions 192 may support and attach the outer flow path wall 102 to the nacelle 24 (e.g., to the external skin 84) (see FIGS. 1 and 2). The outer strut portion 192 may be configured as a contiguous portion of the respective strut 154 or a noncontiguous portion of the respective strut 154. As shown in FIG. 5, for example, the outer strut portion 192 (e.g., a noncontiguous outer strut portion 192) is separated from a remainder of the respective strut 154 by the nozzle housing 158. Alternatively, the strut 154 may extend through the nozzle housing 158 to the outer strut portion 192 (e.g., a contiguous outer strut portion 192). In this case, the passage outlet 188 may be formed through the strut 154 within the nozzle housing 158 (e.g., the nozzle cavity 174). The present disclosure, however, is not limited to use of the struts 154 for supporting and attaching the outer flow path wall 102 to the nacelle 24 (e.g., to the external skin 84), and mounting configurations using, for example, mechanical fasteners, welding, bonding, and the like may alternatively be considered, consistent with aspects of the present disclosure.

The control valve 156 may be connected in fluid communication with the at least one strut 154 and the upstream conduit 184 to control a flow rate of the compressor bleed air 90 directed to the nozzle 152 from the compressor section 32 (see FIG. 2). The control valve 156 may be connected upstream of the at least one strut 154. The control valve 156 is selectively positionable in a closed position (e.g., a fully closed position), an open position (e.g., a fully open position), and a plurality of intermediate positions between the closed position and the open position, to control a flow rate of the compressor bleed air 90 through the control valve 156.

The heat exchanger 96 includes a heat exchanger body 194 and a plurality of heat transfer surface structures 196. The heat exchanger body 194 includes an outer side 198, an inner side 200, an upstream end 202, a downstream end 204, a first lateral side 206, and a second lateral side 208. The outer side 198 is disposed at (e.g., on, adjacent, or proximate) the inner flow path wall 100. The inner side 200 is disposed inward (e.g., radially inward) of the outer side 198. For example, the inner side 200 may be positioned within the nacelle 24 (see FIG. 2). The upstream end 202 is disposed at (e.g., on, adjacent, or proximate) or downstream of the venturi channel 134. The downstream end 204 is disposed at (e.g., on, adjacent, or proximate) or upstream of the air outlet 108. The first lateral side 206 may be disposed at (e.g., on, adjacent, or proximate) the first lateral wall portion 128. The second lateral side 208 may be disposed at (e.g., on, adjacent, or proximate) the second lateral wall portion 130.

Figure 6:
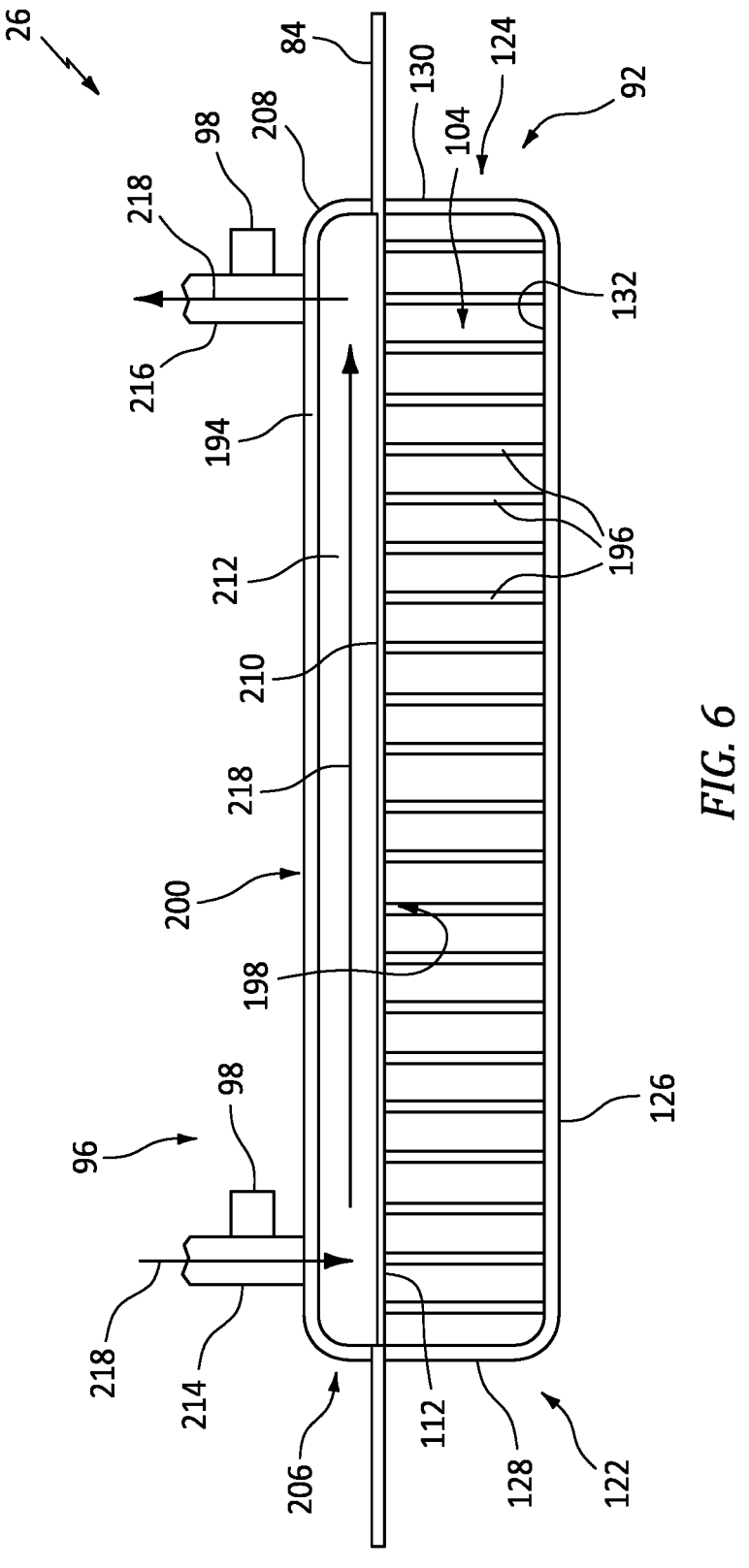
FIG. 6 illustrates a cutaway, aft view of the heat exchanger assembly of FIG. 3, in accordance with one or more embodiments of the present disclosure.

The heat exchanger body 194 forms a heat transfer panel 210, a heat transfer plenum 212, a plenum inlet 214, and a plenum outlet 216. The heat transfer panel 210 is disposed at (e.g., on, adjacent, or proximate) the outer side 198. The heat transfer panel 210 is positioned to separate the heat transfer plenum 212 from the air flow cavity 104. For example, the heat transfer panel 210 may form a portion of the inner flow path wall 100 and its inner flow path surface 112. The heat exchanger body 194 surrounds and forms the heat transfer plenum 212 within the heat transfer body 194. The heat transfer plenum 212 is positioned coincident with the heat transfer panel 210. The heat exchanger body 194 forms the plenum inlet 214 for the heat transfer plenum 212 at (e.g., on, adjacent, or proximate) the inner side 200. As shown in FIG. 6, for example, the plenum inlet 214 may be disposed at (e.g., on, adjacent, or proximate) the first lateral side 206. The heat exchanger body 194 forms the plenum outlet 216 for the heat transfer plenum 212 at (e.g., on, adjacent, or proximate) the inner side 200. As shown in FIG. 6, for example, the plenum outlet 216 may be disposed at (e.g., on, adjacent, or proximate) the second lateral side 208.

The plurality of heat transfer surface structures 196 are positioned within the air flow cavity 104 to facilitate the transfer of heat energy to or from air flowing through the air flow cavity 104 along the air flow path 110. The plurality of heat transfer surface structures 196 are disposed (e.g., mounted) on the heat transfer panel 210, for example, along the inner flow path surface 112. The plurality of heat transfer surface structures 196 may extend outward from the heat transfer panel 210 to or toward the outer flow path wall 102. The plurality of heat transfer surface structures 196 of FIGS. 3-6 are configured as parallel heat transfer plates. Each heat transfer plate generally extends from the upstream end 202 to the downstream end 204 and is laterally spaced from adjacent heat transfer plates. Alternative heat transfer surface structure configurations such as, but not limited to, airfoils, winglets, pedestal pipes, and the like may alternatively be considered. It should be understood that the present disclosure is not limited to the particular configuration of the heat exchanger 96 of FIGS. 3-6, and other heat exchanger configurations may alternatively be considered, consistent with aspects of the present disclosure.

The heat exchanger assembly 26 of the present disclosure is configured to facilitate thermal management of (e.g., heating or cooling of) a fluid 218 of the aircraft 1000, the propulsion system 20, and/or the gas turbine engine 22. As an example, the fluid 218 may be a lubricant (e.g., oil) of a lubrication system used for lubricating, cooling, and cleaning bearings and rotational assembly components of the gas turbine engine 22. As another example, the fluid 218 may be air used for cooling one or more components of the gas turbine engine such as, but not limited to, components of the combustor section 34 (e.g., a combustion chamber liner or heat shield) or the turbine section 36 (e.g., a turbine rotor) (see FIG. 2). As another example, the fluid 218 may be a hydraulic fluid used for operation of aircraft 1000 control surfaces (see FIGS. 1 and 2). As another example, the fluid 218 may be a fuel (e.g., cryogenic hydrogen, kerosene, etc.) which may be heated prior to introduction (e.g., injection) into the combustor 46 for combustion (see FIG. 2). As shown, for example, in FIGS. 3 and 6, the fluid 218 is directed to the plenum inlet 214. The fluid 218 flows through the heat transfer plenum 212 and is directed out of the heat transfer plenum 212 through the plenum outlet 216. The fluid 218 may be directed to and from the heat exchanger assembly 26 (e.g., the plenum inlet 214 and the plenum outlet 216) by any suitable conduit (e.g., pipe, hose, tube, etc.), series of conduits, or fluid systems configured to convey the fluid 218.

In a normal (e.g., flight; non-hotel) mode of operation of the gas turbine engine 22, rotation of the propeller 78 and/or motion of the aircraft 1000 through the air, causes ambient air to flow through the heat exchanger assembly 26 (e.g., the air flow cavity 104) along the air flow path 110. Ambient air flowing through the air flow cavity 104 interacts with the plurality of heat transfer surface structures 196 and the heat transfer panel 210 to transfer heat to or from the fluid 218 flowing through the heat transfer plenum 212 (e.g., from the plenum inlet 214 to the plenum outlet 216).

In the hotel mode of operation, as previously discussed, the aircraft 1000 may be grounded with the propeller 78 stationary, locked, and/or decoupled from the second shaft 72 (see FIG. 2). Thus, in the hotel mode of operation, there may be limited ambient air flow through the air flow cavity 104 along the air flow path 110, as a result of propeller 78 and/or aircraft 1000 motion. In this hotel mode of operation, the compressor bleed air 90 is directed (e.g., supplied) to the nozzle 152. The compressor bleed air 90 is directed by the nozzle 152 (e.g., via the nozzle outlet 178) into the venturi channel 134. As the compressor bleed air 90 is directed into and through the venturi channel 134 (e.g., a converging portion of the venturi channel 134), a velocity of the compressor bleed air 90 increases while a pressure of the compressor bleed air 90 decreases, creating a partial vacuum which draws ambient air into the venturi channel 134. Accordingly, operation of the heat exchanger assembly 26 to direct the compressor bleed air 90 through the venturi channel 134 draws ambient air into and through the air flow cavity 104 along the air flow path 110 for interaction with the heat exchanger 96. In this regard, the nozzle 152 and the venturi channel 134 may be understood to form a jet pump (sometimes referred to as an "eductor"). The resulting mixture of the compressor bleed air 90 and the ambient air flowing through the air flow cavity 104 interacts with the plurality of heat transfer surface structures 196 and the heat transfer panel 210 to transfer heat to or from the fluid 218 flowing through the heat transfer plenum 212 (e.g., from the plenum inlet 214 to the plenum outlet 216).

While the present disclosure heat exchanger assembly 26 is described above with respect to facilitating thermal management of a fluid (e.g., the fluid 218), aspects of the present disclosure may be applied to facilitate thermal management of a plurality of different fluids. For example, the aircraft 1000, the propulsion system 20, and/or the gas turbine engine 22 may include a plurality of discrete heat exchanger assemblies 26. Alternatively, the heat exchanger assembly 26 may include a plurality of discrete heat exchangers (e.g., the heat exchanger 96) directed to facilitating thermal management of a plurality of different respective fluids.

The heat exchanger assembly 26 facilitates thermal management of aircraft, propulsion system, and/or gas turbine engine fluids, as described above. The heat exchanger assembly 26 of the present disclosure is positioned at an aerostructure (e.g., nacelle) exterior. The heat exchanger assembly 26 may, therefore, operate independently of internal air intake assemblies such as, for example, the air intake 40 of FIGS. 1 and 2 for directing ambient air into the core flow path 86 of the gas turbine engine 22. In at least some conventional aircraft propulsion systems of which I am aware, thermal management systems may be positioned within or supplied with ambient air by these internal air intake assemblies. However, this configuration of conventional aircraft propulsion systems increases air flow requirements for the associated internal air intake assembly, leading to an increase in the size (e.g., cross-sectional area) of the air intake inlet (e.g., the intake inlet 60). This increase in air intake inlet size increases aircraft aerodynamic drag and weight and, therefore, limits aircraft performance (e.g., maximum speed, maximum range, fuel consumption, etc.). The present disclosure heat exchanger assembly 26 facilitates a reduction in intake inlet 60 size, relative to at least some conventional aircraft propulsion systems, while still providing thermal management during both normal and hotel modes of operation.

The one or more sensors 98 may be configured as fluid temperature detectors. For example, the one or more sensors 98 may include a fluid inlet temperature detector configured to measure a temperature of the fluid 218 flowing to or within the plenum inlet 214. Additionally or alternatively, the one or more sensors 98 may include a fluid outlet temperature detector configured to measure a temperature of the fluid 218 flowing from or within the plenum outlet 216.

Referring to FIGS. 2 and 3, the control system 28 may be connected in signal communication with the control valve 156 and the one or more sensors 98. The control system 28 of FIG. 2 includes a processor 220 and memory 222. The memory 222 is connected in signal communication with the processor 220. The processor 220 may include any type of computing device, computational circuit, or any type of process or processing circuit capable of executing a series of instructions that are stored in the memory 222, thereby causing the processor 220 to perform or control one or more steps or other processes. The processor 220 may include multiple processors and/or multicore CPUs and may include any type of processor, such as a microprocessor, digital signal processor, co-processors, a micro-controller, a micro-computer, a central processing unit, a field programmable gate array, a programmable logic device, a state machine, logic circuitry, analog circuitry, digital circuitry, etc., and any combination thereof. The instructions stored in memory 222 may represent one or more algorithms for controlling aspects of the propulsion system 20 and its heat exchanger assembly 26, and the stored instructions are not limited to any particular form (e.g., program files, system data, buffers, drivers, utilities, system programs, etc.) provided they can be executed by the processor 220. The memory 222 may be a non-transitory computer readable storage medium configured to store instructions that when executed by one or more processors, cause the one or more processors to perform or cause the performance of certain functions. The memory 222 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the control system 28 may be achieved via the use of hardware, software, firmware, or any combination thereof. The control system 28 may also include input and output devices (e.g., keyboards, buttons, switches, touch screens, video monitors, sensor readouts, data ports, etc.) that enable the operator to input instructions, receive data, etc. The control system 28 may be located within the propulsion system 20 or may be located on the aircraft 1000 (see FIG. 1) on which the propulsion system 20 is installed.

The control system 28 may form or otherwise be part of an electronic engine controller (EEC) for the propulsion system 20. The EEC may control operating parameters of the gas turbine engine 22 including, but not limited to, fuel flow, stator vane position (e.g., variable compressor inlet guide vane (IGV) position), compressor air bleed valve position, propeller 78 rotation speed, propeller blade 80 pitch, etc. so as to control an engine power and/or thrust of propulsion system 20. In some embodiments, the EEC may be part of a full authority digital engine control (FADEC) system for the propulsion system 20.

The instructions stored in memory 222, when executed by the processor 220, may cause the control system 28 and/or its processor 220 to control a position of the control valve 156 to control a flow rate of the compressor bleed air 90 supplied to the nozzle 152 and directed, by the nozzle 152, into the venturi channel 134 from the nozzle outlet 178. For example, the control system 28 may control a position of the control valve 156 based on an identified mode of operation of the propulsion system 20 and/or its gas turbine engine 22. The control system 28 may identify the hotel mode of operation for the gas turbine engine 22. The control system 28 may identify the hotel mode of operation based on a determination that the gas turbine engine 22 is operating with the propeller 78 stationary, locked, and/or decoupled from the second shaft 72. Additionally or alternatively, the control system 28 may identify the hotel mode of operation based on a user-selected (e.g., pilot selected) command. With the hotel mode of operation identified, the control system 28 may control a position of the control valve 156 (e.g., a position other than the closed position) to direct the compressor bleed air 90 to the nozzle 152. When the propulsion system 20 and/or its gas turbine engine 22 have a mode of operation other than the hotel mode of operation (e.g., the gas turbine engine 22 operating with the propeller 78 rotating; the gas turbine engine 22 secured; etc.), the control system 28 may control the control valve 156 to be positioned in the closed position.

The control system 28 may control a position of the control valve 156 based on an output (e.g., a temperature output signal) from the one or more sensors 98. For example, the control system 28 may control a position of the control valve 156 based on a measured temperature of the fluid 218 (e.g., at the plenum outlet 216) based on a temperature output signal from the one or more sensors 98. The control system 28 may control (e.g., throttle) a position of the control valve 156 to increase a flow rate of the compressor bleed air 90 to the nozzle 152 based on identification of the measured temperature of the fluid 218 equal to or greater than a first temperature threshold value. The increased flow rate of the compressor bleed air 90 to the nozzle 152 may increase the flow rate of the air (e.g., the mixture of the ambient air and the compressor bleed air 90) directed through the heat exchanger 96, thereby reducing a temperature of the fluid 218. The control system 28 may control (e.g., throttle) a position of the control valve 156 to decrease a flow rate of the compressor bleed air 90 to the nozzle 152 based on identification of the measured temperature of the fluid 218 equal to or less than a second temperature threshold value. The decreased flow rate of the compressor bleed air 90 to the nozzle 152 may decrease the flow rate of the air (e.g., the mixture of the ambient air and the compressor bleed air 90) directed through the heat exchanger 96, thereby increasing a temperature of the fluid 218.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A heat exchanger assembly for an aircraft, the heat exchanger assembly comprising:

a housing including an inner flow path wall and an outer flow path wall, the inner flow path wall and the outer flow path wall forming an air inlet, an air outlet, and a venturi channel, the inner flow path wall and the outer flow path wall configured to direct air along an air flow path from the air inlet, through the venturi channel, and to the air outlet, the inner flow path wall forming a rounded inner venturi surface of the venturi channel and the outer flow path wall forming a rounded outer venturi surface of the venturi channel;

a heat exchanger including a heat exchanger body, a heat transfer plenum, a plenum inlet, and a plenum outlet, the heat exchanger body disposed downstream of the venturi channel within the air flow path, the heat exchanger configured to direct a fluid from through the heat transfer plenum from the plenum inlet to the plenum outlet to effect heat transfer between the fluid and the air along the air flow path; and a nozzle including a nozzle housing disposed within the air flow path upstream of the heat exchanger, the nozzle housing forming a nozzle inlet and a nozzle outlet, the nozzle outlet disposed within the venturi channel, a strut mounted to the nozzle housing, the strut extending though the inner flow path wall, and the strut including an outer strut portion disposed between and connecting the nozzle housing and the outer flow path wall.

2. The heat exchanger assembly of claim 1, further comprising a control valve connected in fluid communication with the nozzle inlet, the control valve configured to control a flow rate of pressurized air directed to the nozzle inlet.

3. The heat exchanger assembly of claim 1, wherein the strut is configured as a hollow strut forming an air flow passage, the strut mounted to the nozzle at the nozzle inlet with the air flow passage connected in fluid communication with the nozzle inlet.

4. The heat exchanger assembly of claim 1, wherein the heat exchanger further includes a plurality of heat transfer surface structures extending from the heat exchanger body into the air flow path.

5. The heat exchanger assembly of claim 4, wherein the plurality of heat transfer surface structures includes a plurality of parallel heat transfer plates.

6. The heat exchanger assembly of claim 1, wherein the outer flow path wall extends between and to an upstream end and a downstream end, the air inlet disposed at the upstream end, the air outlet disposed at the downstream end.

7. The heat exchanger assembly of claim 6, wherein the outer flow path wall extends between and to a first lateral side and a second lateral side, the outer flow path wall includes an outer wall portion, a first lateral wall portion, and a second lateral wall portion, the outer wall portion spaced from the inner flow path wall, the first lateral wall portion extending between and connecting the outer wall portion and the inner flow path wall at the first lateral side, the second lateral wall portion extending between and connecting the outer wall portion and the inner flow path wall at the second lateral side.

8. The heat exchanger assembly of claim 1, wherein:

a nacelle external skin forms the inner flow path wall; and the outer flow path wall includes an outer wall portion spaced from the inner flow path wall.

9. An aircraft propulsion system comprising:

a nacelle forming an aerodynamic cover for the propulsion system, the nacelle including an external skin; and a heat exchanger assembly disposed on the external skin, the heat exchanger assembly including:

a housing including an inner flow path wall and an outer flow path wall, the inner flow path wall and the outer flow path wall forming an air inlet, an air outlet, and a venturi channel, the inner flow path wall and the outer flow path wall configured to direct air along an air flow path outside of the nacelle from the air inlet, through the venturi channel, and to the air outlet, the inner flow path wall forming a convex inner venturi surface of the venturi channel, and the outer flow path wall forming a convex outer venturi surface of the venturi channel;

a heat exchanger forming a portion of the air flow path downstream of the venturi channel, the heat exchanger including a plurality of heat transfer surface structures positioned within the air flow path and extending between the inner flow path wall and the outer flow path wall, the plurality of heat transfer surface structures connected to the outer flow path wall;

a nozzle including a nozzle housing disposed within the air flow path upstream of the heat exchanger, the nozzle housing forming a nozzle inlet and a nozzle outlet, the nozzle outlet disposed within the venturi channel; and a strut mounted to the nozzle housing, the strut extending though the inner flow path wall, and the strut including an outer strut portion disposed between and connecting the nozzle housing and the outer flow path wall;

wherein the external skin forms the inner flow path wall, the outer flow path wall includes an outer wall portion, a first lateral wall portion, a second lateral wall portion, and the outer wall portion is spaced from the inner flow path wall.

10. The aircraft propulsion system of claim 9, further comprising a gas turbine engine housed within the nacelle, the gas turbine engine including a compressor section, the compressor section configured to direct compressor bleed air to the nozzle.

11. The aircraft propulsion system of claim 10, wherein the heat exchanger includes a heat exchanger body and a heat transfer plenum, the heat exchanger body forming a heat transfer panel between the air flow path and the heat transfer plenum, the heat transfer panel forming a portion of the inner flow path wall, the heat transfer plenum configured to receive a fluid from the gas turbine engine.

12. An aircraft propulsion system comprising:

a heat exchanger assembly including:

a housing including an inner flow path wall and an outer flow path wall, the inner flow path wall and the outer flow path wall forming an air inlet, an air outlet, and a venturi channel, the inner flow path wall and the outer flow path wall configured to direct air along an air flow path from the air inlet, through the venturi channel, and to the air outlet, the inner flow path wall forming a rounded inner venturi surface of the venturi channel, and the outer flow path wall forming a rounded outer venturi surface of the venturi channel;

a heat exchanger forming a portion of the air flow path downstream of the venturi channel;

a nozzle including a nozzle housing disposed within the air flow path upstream of the heat exchanger, the nozzle housing forming a nozzle inlet and a nozzle outlet, the nozzle outlet disposed within the venturi channel, and the nozzle disposed upstream of the heat exchanger; and a control valve connected in fluid communication with the nozzle inlet, the control valve configured to control a first flow rate of pressurized air directed to the nozzle inlet; and a control system including a processor in communication with a non-transitory memory storing instructions, which instructions when executed by the processor, cause the processor to:

control a position of the control valve to control a second flow rate of air along the air flow path;

identify a hotel mode of operation for gas turbine engine; and control the position of the control valve by opening the control valve in response to identification of the hotel mode of operation.

13. The aircraft propulsion system of claim 12, wherein the gas turbine engine includes a propeller and the propeller is stationary during the hotel mode of operation for the gas turbine engine.

14. The aircraft propulsion system of claim 13, wherein the instructions, when executed by the processor, further cause the processor to:

identify a second mode of operation for gas turbine engine, the second mode of operation different than the hotel mode of operation; and control the position of the control valve by shutting the control valve in response to identification of the second mode of operation.

15. The aircraft propulsion system of claim 14, wherein the propeller is rotating during the second mode of operation for the gas turbine engine.

16. The aircraft propulsion system of claim 12, wherein:

the heat exchanger assembly further includes a temperature sensor disposed at the heat exchanger, the temperature sensor connected in signal communication with the control system; and wherein the instructions, when executed by the processor, further cause the processor to control the position of the control valve based on a temperature output signal of the temperature sensor.

* * * * *